United States Patent Office 3,825,531
Patented July 23, 1974

3,825,531
PROCESS FOR PRODUCING PENICILLIN
DERIVATIVES
Toshiyasu Ishimaru, Suita, and Yutaka Kodama, Toyama, Japan, assignors to Toyama Chemical Co., Ltd., Tokyo, Japan
No Drawing. Filed June 28, 1972, Ser. No. 267,081
Claims priority, application Japan, July 8, 1971, 46/50,446
Int. Cl. C07d 99/16
U.S. Cl. 260—239.1     5 Claims

ABSTRACT OF THE DISCLOSURE

Penicillin or penicillin sulfoxide esters are prepared in an industrially advantageous manner, by reacting an N,N-disubstituted-acid amide with a chloroformate, and then reacting the imino ether salt thus obtained with the salt of a penicillin or a penicillin sulfoxide.

BACKGROUND OF THE INVENTION

Field of the Invention

This invention relates to a process for producing penicillin or penicillin sulfoxide esters.

Description of the Prior Art

Penicillin or penicillin sulfoxide esters, such as, for example, 2,2,2-trichloroethyl ester are very useful starting materials for the production of 7-acylamino-3-methyl-3-cephem-4-carboxylic acid esters.

These esters have heretofore been produced by reacting a salt of penicillin or a penicillin sulfoxide with 2,2,2-trichloroethylchloroformate in the presence of a solvent. The mixed acid anhydride thus obtained is then decarboxylated by treatment with a base. (See *Chemical Abstracts* 74, 22826; 74, 22861 (1971).) It is also known to produce these esters by reacting penicillin or penicillin sulfoxide and 2,2,2-trichloroethyl alcohol with phosgene in the presence of an acid-binding agent (see *Chemical Abstracts* 73, 79032 (1970), and Japanese Patent Publication No. 31,306/1970). These prior art techniques, however, are rather complicated, and the yield of obtainable product is rather low.

It would be desirable, therefore, to provide a technique of producing penicillin or penicillin sulfoxide esters in high yield and in a more industrially advantageous process than has heretofore been available.

SUMMARY OF THE INVENTION

It has now been discovered that penicillin or penicillin sufoxide esters can be produced by reacting an N,N-disubstituted-acid amide, represented by the formula (I):

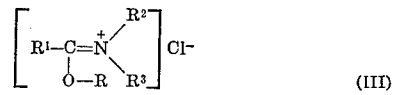

wherein $R^1$ represents a hydrogen, or substituted or unsubstituted alkyl, aryl, aralkyl or cycloalkyl group; $R^2$ and $R^3$, which may be the same or different, represents alkyl group, or $R^2$ and $R^3$ together may jointly form a pyrrolidine, piperidine, or morpholine ring, with a chloroformate having the formula (II):

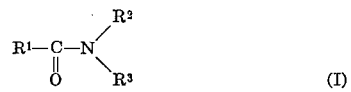

wherein R represents $$-CH_2CH_2X, -CH_2CHX_2, -CH_2CX_2$$

(wherein X represents a halogen atom), succinimidomethyl, or phthalimidomethyl group, to form an imino ether salt of the formula (III):

This salt is then reacted with the salt of penicillin or a penicillin sulfoxide.

The reaction scheme of the present invention is as follows:

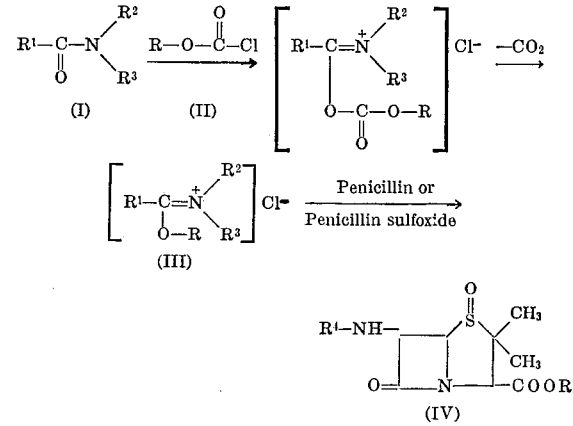

wherein $R^4$ represents an acyl group (wherein $R^1$, $R^2$, $R^3$ and R are as defined above).

It has been previously reported that the reaction of the N,N-disubstituted acid amide (I) with the chloroformate (II) to form an imino ether (III) can only be carried out when R is an aryl group, such as a phenyl, P-nitrophenyl, 2,4,5-trichlorophenyl, or pentachlorophenyl group, or a succinimido group. (See *Angewandte Chemie* 72, 336 (1960), *Chemical Pharmaceutical Bulletin* 18, 784 1970).) It was reported that when R is an alkyl or aralkyl group, an alkylchloride (RCl) is formed without the formation of signficant quantities of imino ether salts.

Contrary to these findings, it has been found that when R is a haloethyl group having an electron attractive group, salts of imino ethers (III) are formed in exceptionally high yields.

Suitable N,N-disubstituted acid amides (I) which can be used herein include N,N-dimethylformamide, N,N-diethylformamide, N,N - dimethylacetamide, N,N - diethylacetamide, N,N-dimethylpropionamide, N,N-dimethylbutyramide, N,N-dimethylvaleramide, N,N-dimethylcapramide, N,N - dimethylbenzamide, N,N - dimethylphenylacetamide, N,N-dimethylhexahydrobenzamide, N-formylpyrrolidine, N-acetylpiperidine, N-formylpiperidine, N-formylmorpholine, N - acetylmorpholine, etc. Particularly preferable are N,N-dimethylformamide, N,N-dimethylacetamide, N,N-diethylformamide, etc., because they may be readily removed by washing with water after the reaction.

The compound of formula (I) may be used in any amount greater than equimolar based on the penicillin or penicillin sulfoxide salt used, but preferably it is used in an amount of 2 to 5 mols/mole. It may also be used in a large excess and thus function as a reaction solvent.

The chloroformates (II) are obtained by reacting the corresponding alcohol, such as 2-bromoethanol, 2-iodoethanol, 2,2-dichloroethanol, 2,2,2-trichloroethanol, 2,2,2-tribromoethanol, succinimidomethanol, phthalimidomethanol, etc. with phosgene in the presence of acid-burning agent. Good results are obtainable when the compound of formula (II) is used in an amount of more than an equimolar amount based on the penicillin or penicillin sulfoxide salt used. Best results are obtainable in practice, however, when it is used in an amount of 1.0–1.5 moles/mole.

The penicillin or penicillin sulfoxide used herein as a starting material are those represented by the formulae:

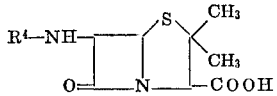

Penicillin
or
Penicillin sulfoxide

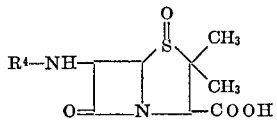

wherein $R^4$ is as defined above. These compounds may be used in the form of an alkali or alkali earth metal salt or an organic tertiary amine salt. Particularly suitable salts are the salts of sodium, potassium, magnesium, calcium, triethylamine, tributylamine, N-methylmorpholine, N-ethylpiperidine, pyridine, picoline, collidine, lutidine salts etc. Penicillin G, penicillin V, and the sulfoxides thereof obtained by oxidation, are the most suitable because penicillin G and penicillin V are easily produced biologically at low costs. Of course, any other penicillin or the penicillin sulfoxides which can be converted into cephalosporins possessing antibacterial activities can be used. The penicillins and penicillin sulfoxides may have an acyl group in its 6-position such as a thienylacetyl group, N-protected-α-amino-phenylacetyl group, α-aminothienylacetyl group, α-amino - substituted - phenylacetyl group, or the like.

In carrying out the process of this invention, a chloroformate (II) is dissolved into a solvent, such as methylene chloride, chloroform, carbon tetrachloride, ethylene chloride, ethyl acetate, methylchloroform, dioxane, tetrahydrofuran, benzene, toluene, ethyl ether, isopropyl ether, dimethylsulfoxide, etc. or a mixture thereof, and the N,N-disubstituted acid amide (I) is added dropwise while the reaction vessel is chilled in ice. Alternatively, the N,N-disubstituted acid amide (I) may be added dropwise to the chloroformate (II) in the absence of a solvent. The solution is then gradually raised in temperature, and is stirred at room temperature so as to effect decarboxylation. After the reaction has proceeded sufficiently, the solution is again cooled to below 0° C., and the penicillin or penicillin sulfoxide salt is added thereto to effect a slight exothermic reaction. After the solution is reacted at below 0° C. for 3 to 4 hours, the temperature of the solution is gradually raised to room temperature in order to complete the reaction. If necessary, the reaction solution is diluted with methylene chloride, chloroform, ethyl acetate, or the like, and it is then sufficiently washed with water. The pH is adjusted to between 7 and 8 with an alkali hydrogen carbonate solution. The organic layer is collected, and is dried, and then is evaporated to obtain the ester of the compound of formula (IV).

The penicillin esters thus obtained is oxidized with an oxidizing agent known per se so as to form the ester of penicillin sulfoxide. The ester of the penicillin sulfoxide may be converted to the ester of 7-acylamido-3-methyl-3-cephem-4-carboxylic acid by ring expansion reaction used with acid catalyst known per se.

It should be understood from the foregoing description that the present invention is a process for producing penicillin or penicillin sulfoxide esters with very simple operation in high yield, and is very economic and valuable as a process for producing intermediates useful for conversion to cephalosporins.

The following Examples are given by way of illustration only and are not to be construed as limiting unless otherwise so specified.

EXAMPLE 1

5.1 g. of 2,2,2-trichloroethylchloroformate was dissolved in 20 ml. of methylene chloride, and 4.4 g. of dimethylformamide was added dropwise thereto with stirring while being cooled in ice. After being stirred for approximately 20 minutes, it was removed from the ice bath and the solution was permitted to gradually rise to room temperature. Decarboxylation occurred and white crystals were deposited. It was then cooled to −10° C., and 7.8 g. of penicillin G potassium salt was added thereto. After the mixture was stirred at below 0° C. for 3 hours, and then at room temperature for 1 hour, it was poured into 30 ml. of ice water, still being stirred. The pH was adjusted to 7.5 with a sodium hydrogen carbonate solution, and the organic layer was collected and sufficiently washed with water. After the organic layer was dried over anhydrous magnesium sulfate, the solvent was evaporated under reduced pressure, and the residual white crystals were washed with n-hexane. 9.7 g. (94.5%) of 2,2,2-trichloroethyl ester of penicillin G having a melting point of 146° to 149° C. was obtained. Upon recrystallization from ethyl acetate-ether, white crystals having a melting point of 155° to 156° C. were obtained.

EXAMPLE 2

12.5 g. of 2,2,2-trichloroethylchloroformate was dissolved in 40 ml. of methylene chloride, and the solution was cooled to 0° C. 11 g. of dimethylformamide was added thereto. The mixture was stirred for 30 minutes and the temperature of the mixture was gradually raised to room temperature. The mixture was again cooled to −10° C., and 19 g. of penicillin G potassium salt was added thereto and then 4 g. of pyridine was added dropwise thereto over a period of 30 minutes. After the mixture was reacted at −10° C. for 3 hours, the temperature was raised to 0° C. over a period of 1 hour. The temperature was then maintained at 15° to 20° C. for 30 minutes. The reaction mixture was diluted with ice water, and pyridine was removed therefrom with 2 N-hydrochloric acid. The mixture was adjusted to a pH of 7.2 with sodium hydrogen carbonate, and an organic layer was collected. After the organic layer was sufficiently dried over anhydrous magnesium sulfate, the solvent was evaporated under reduced pressure, and the crystals thus obtained were washed with n-hexane. 22.3 g. (95.5%) of pale yellow crystals of 2,2,2-trichloroethyl ester of penicillin G having a melting point of 143° to 148° C. were obtained.

EXAMPLE 3

A solution of 5.1 g. of 2,2,2-trichloroethylchloroformate in 20 ml. of methylene chloride was cooled to 0° C., and 5.5 g. of dimethylacetamide was added thereto. The reaction solution was raised gradually to room temperature while being stirred so as to complete the decarboxylation. Then, the mixture was cooled to −10° C., and 8 g. of penicillin V potassium salt was added thereto, and the mixture was stirred at a temperature of below 0° C. for 2 hours. The reaction mixture was then washed with 2N-hydrochloric acid, and the pH adjusted to 7.5 with sodium hydrogen carbonate, and an organic layer was collected. After the organic layer was dried over anhydrous magnesium sulfate, the solvent was evaporated under reduced pressure, and the residue was washed with n-hexane. 8.8 g. (87%) of syrup of 2,2,2-trichloroethyl ester of penicillin V was obtained.

After the product was obtained, it was dissolved in methylene chloride, and 10%-peracetic acid was added dropwise while being cooled in ice to effect oxidation. An organic layer was found and was washed with water. It was then washed with a sodium hydrogen carbonate solution, and 2,2,2-trichloroethyl ester of penicillin V sulfoxide having a melting point of 141° to 143° C. was obtained.

The infrared absorption spectrum and thin layer chromatogram of the product were identical with those of a standard sample.

EXAMPLE 4

5.1 g. of 2,2,2-trichloroethylchloroformate was dissolved in 20 ml. of methylene chloride, and 4.5 g. of dimethylformamide was added thereto while being cooled in ice. The temperature of the reaction mixture was raised gradually to room temperature while being stirred so as to complete the decarboxylatin. The mixture was then cooled to −10° C., and 7.8 g. of potassium salt of penicillin G sulfoxide was added thereto. After the mixture was reacted at below 0° C. for 3 hours, it was stirred at room temperature for 30 minutes. The mixture was diluted with ice water and the pH was adjusted to 7.2 with sodium hydrogen carbonate. An organic layer was collected, and was thoroughly washed with water. It was then dried over anhydrous magnesium sulfate. The solvent was then evaporated under reduced pressure, to obtain 9.25 g. (96%) of crude crystals of 2,2,2-trichloroethyl ester of penicillin G sulfoxide. When recrystallized from methanol, white crystals having a melting point of 171° to 173° C. were obtained.

EXAMPLE 5

The procedure of Example 4 was repeated under the same conditions, except that 8.1 g. of potassium salt of penicillin V sulfoxide was used instead of the potassium salt of penicillin G sulfoxide. 9.2 g. (92.5%) of pale yellow crystals of 2,2,2-trichloroethyl ester of penicillin V sulfoxide were obtained. When recrystallized from methanol, white crystals having a melting point of 144° to 146° C. were obtained.

EXAMPLE 6

The procedure of Example 4 was repeated under the same conditions, except that 6.5 g. of diethylformamide was used instead of dimethylformamide. 9.0 g. (93.5%) of 2,2,2-trichloroethyl ester of penicillin G sulfoxide was obtained.

Having now fully described the invention, it will be apparent to one of ordinary skill in the art that many changes and modifications can be made thereto without departing from the spirit or scope of the invention as set forth herein.

Accordingly, what is claimed and intended to be covered by Letters Patent is:

1. A process for producing penicillin or a penicillin sulfoxide ester which comprises (a) reacting an N,N-disubstituted-acid amide represented by the formula:

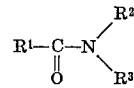

wherein $R^1$ represents hydrogen, or lower alkyl group; $R^2$ and $R^3$, which may be the same or different, and each represents lower alkyl group, with a chloroformate of the formula:

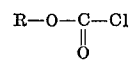

wherein R represents —$CH_2CH_2X$, —$CH_2CHX_2$, —$CH_2CX_3$ (wherein X represents a halogen atom) to obtain an imino ether salt; and (b) reacting said imino ether salt with a alkali-metal salt of a penicillin or penicillin sulfoxide selected from the group consisting of penicillin G, penicillin V, penicillin G sulfoxides and penicillin V sulfoxides.

2. The process according to Claim 1, wherein the N,N-disubstituted-acid amide is selected from the group consisting of dimethylformamide, diethylformamide and dimethylacetamide.

3. The process according to Claim 1, wherein the chloroformate is 2,2,2-trichloroethylchloroformate.

4. The process according to Claim 1, wherein the penicillin is selected from the group consisting of penicillin G and penicillin V.

5. The process according to Claim 1, wherein the penicillin sulfoxide is selected from the group consisting of penicillin G sulfoxide and penicillin V sulfoxide.

References Cited

UNITED STATES PATENTS 3,642,810   2/1972   Bamberg et al. ____ 260—239.1

NICHOLAS S. RIZZO, Primary Examiner

U.S. Cl. X.R.

424—271